United States Patent Office 3,166,531
Patented Jan. 19, 1965

3,166,531
DYEABLE POLYESTERS MODIFIED BY A (METAL-LO - SULFOPHENOXY)ALKOXY - SUBSTITUTED AROMATIC MONOCARBOXYLIC ACID OR ESTER
Christian F. Horn, South Charleston, W. Va., assignor to Union Carbide Corporation, a corporation of New York
No Drawing. Filed Nov. 1, 1961, Ser. No. 149,229
19 Claims. (Cl. 260—49)

The invention relates to new condensation polymers. The invention also relates to textile articles, i.e., fibers, filaments, yarns, etc., as well as to films and other structures of said polymers which have an improved affinity for dyestuffs.

Synthetic linear polyesters are well known to the art and area readily prepared, for example, by the reaction of dibasic carboxylic acids, or their esters forming derivatives, with dihydric alcohols, or their functional derivatives. The high-molecular weight linear polyesters thus obtained find frequent use in the production of textile articles, films, and the like. Of particular interest in this regard are the polyesters of terephthalic acid and its esters with glycols, such as polyethylene terephthalate, and the polyester from dimethyl terephthalate and 1,4-cyclohexanedimethanol, etc. Unfortunately, the filamentous products produced from these polyesters have little affinity for dyestuffs by conventional dyeing procedures, and consequently, their utility in the fabric field is somewhat restricted.

It was to be expected that many efforts would be made to improve the dyeability of a film-, and filament-forming material having as many desirable characteristics as those possessed by polyethylene terephthalate. Such effort have indeed been made. However, the efforts that have resulted in some degree of success in making polyethylene terephthalate more dyeable have done so only at the expense of degrading the polymer substantially with respect to its other characteristics. Thus, for example, a reported effort to improve the dyeability of polyethylene terephthalate by incorporating within its structure minor amounts of certain amino alcohols, thereby giving the polymer a greater ability to absorb acetate dyes and acid dyes, seriously reduces the heat stability of the polyethylene terephthalate so modified. Another effort in this direction involved chemical incorporation of long chain polyalkylene oxides having molecular weights of the order of 1000 to 6000. This modification of the polyethylene terephthalate, unfortunately, made it quite sensitive to air oxidation and to light. Another proposal involved the utilization of toxic carriers such as the chlorobenzenes, chlorophenols, and the like, for the dyeing process. Still another involved the application of vat or acetate dyes under superatomspheric pressure at temperatures above 100° C. Another required the use of fiber-swelling agents or dye carriers. Still another involved the use of pigments that are mixed directly with the polyethylene terephthalate melt before spinning.

It is apparent that these efforts have at best had very limited success. The methods involving chemical incorporation of modifying agents such as amino alcohols and polyalkylene oxides have involved substantial reduction in thermal stability, the use of toxic carriers is inherently undesirable and dangerous, and special dyeing techniques, such as those requiring dyestuffs that are stable at high temperatures, are too expensive to be commercially practicable.

These difficulties have now been overcome without significantly impairing the characteristics of the polyester. Thus, for example, polyethylene terephthalate fibers and films made in accordance with the method of this invention as hereinbelow described are readily dyeable by ordinary dyeing techniques, while at the same time retaining excellent heat and light stability, dimensional stability and other desirable physical properties.

The dyeable linear polyesters of this invention are produced essentially from an aromatic dicarboxylic acid or an ester forming derivative thereof, with a diol, such as an acyclic or alicyclic aliphatic glycol, an aromatic diol, an aliphatic-aromatic diol, or a diester thereof, and a small amount of metallosulfophenoxyalkoxy-substituted aromatic monocarboxylic acid are ester represented by the generic formula:

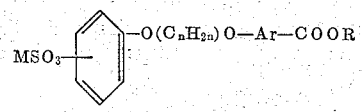

wherein M designates an alkali metal atom, as for instance, a lithium, sodium, potassium, rubidium, or cesium atom, etc., and preferably designates an alkali metal atom having an atomic number of from 3 to 19, i.e., a lithium, sodium, or potassium atom; $n$ designates an integer of from 1 to about 12, and preferably from 1 to about 8; Ar designates a divalent arylene radical, such as a phenylene or naphthylene radical, etc.; and R designates a hydrogen atom or an alkyl radical containing from 1 to about 8 carbon atoms, such as a methyl, ethyl, propyl, butyl, isobutyl, pentyl, hexyl, 2-methylpentyl, 2-ethylbutyl, heptyl, octyl, or 2-ethylhexyl radical, etc., of which the lower alkyl radicals containing from 1 to about 4 carbon atoms are preferred.

As typical of the metallosulfophenoxyalkoxy-substituted aromatic monocarboxylic acids and esters which can be used to prepare dyeable linear polyesters in accordance with this invention, there can be mentioned:

3-([4-((sodiumsulfo))phenoxy]methoxy)benzoic acid
2-(2-[4-((lithiumsulfo))phenoxy]ethoxy)benzoic acid
3-(2[4-((potassiumsulfo))phenoxy]ethoxy)benzoic acid
3-(2-[3-((sodiumsulfo))phenoxy]ethoxy)benzoic acid
4-(2-[4-((lithiumsulfo))phenoxy]ethoxy)benzoic acid
3-(3-[4-((potassiumsulfo))phenoxy]propoxy)benzoic acid
3-(4-[4-((sodiumsulfo))phenoxy]butoxy)benzoic acid
3-(6-[4-((lithiumsulfo))phenoxy]hexoxy)benzoic acid
3-(8-[4-((potassiumsulfo))phenoxy]octoxy)benzoic acid
3-(2-ethyl-6-[4-((sodiumsulfo))phenoxy]hexoxy)benzoic acid
3-(12-[4-((lithiumsulfo))phenoxy]dodecoxy)benzoic acid
4-(2-[4-((potassiumsulfo))phenoxy]ethoxy)naphthoic acid
Methyl 3-([4-((sodiumsulfo))phenoxy]methoxy)benzoate
Octyl 2-(2-[4-((lithiumsulfo))phenoxy]ethoxy)benzoate
2-ethylhexyl 3-(2-[4-((potassiumsulfo))phenoxy]ethoxy)benzoate Butyl 3-(2-[3-((sodiumsulfo))phenoxy]ethoxy)benzoate
Propyl 4-(2-[4-((lithiumsulfo))phenoxy]ethoxy)benzoate
Ethyl 3-(3-[4-((potassiumsulfo))phenoxy]propoxy)benzoate
Methyl 3-(4-[4-((sodiumsulfo))phenoxy]butoxy)benzoate
Methyl 3-(6-[4-((lithiumsulfo))phenoxy]hexoxy)benzoate
Methyl 3-(8-[4-((potassiumsulfo))phenoxy]octoxy)benzoate
Methyl 3-(2-ethyl-6-[4-((sodiumsulfo))phenoxy]hexoxy)benzoate
Methyl 3-(12-[4-((lithiumsulfo))phenoxy]dodecoxy)benzoate
Methyl 4-(2-[4-((potassiumsulfo))phenoxy]ethoxy)naphthoate, and the like.

The present invention is especially concerned with the use of the metallosulfophenoxyalkoxybenzoic acids and esters represented by the sub-generic formula:

(II) 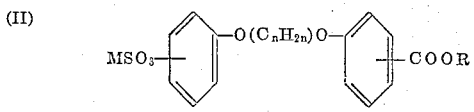

wherein M, n and R are as defined above.

The metallosulfophenoxyalkoxy-substituted aromatic monocarboxylic acids and esters contemplated by this invention can be produced by steps which include the sulfonation of a member of a known class of compounds, viz., the phenoxyalkoxybenzoic acids and alkyl esters thereof represented by the formula:

(III) 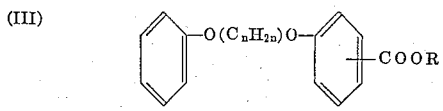

wherein n and R are as defined above. As typical of such known compounds, there can be mentioned:

3-(phenoxymethoxy)benzoic acid
2-(2-phenoxyethoxy)benzoic acid
3-(2-phenoxyethoxy)benzoic acid
4-(2-phenoxyethoxy)benzoic acid
3-(3-phenoxypropoxy)benzoic acid
3-(4-phenoxybutoxy)benzoic acid
3-(6-phenoxyhexoxy)benzoic acid
3-(8-phenoxyoctoxy)benzoic acid
3-(2-ethyl-6-phenoxyhexoxy)benzoic acid
3-(12-phenoxydodecoxy)benzoic acid
Methyl 3-(phenoxymethoxy)benzoate
Octyl 2-(2-phenoxyethoxy)benzoate
2-ethylhexyl 3-(2-phenoxyethoxy)benzoate
Butyl 4-(2-phenoxyethoxy)benzoate
Ethyl 3-(3-phenoxypropoxy)benzoate
Methyl 3-(4-phenoxybutoxy)benzoate
Methyl 3-(6-phenoxyhexoxy)benzoate
Methyl 3-(8-phenoxyoctoxy)benzoate
Methyl 3-(2-ethyl-6-phenoxyhexoxy)benzoate
Methyl 3-(12-phenoxydodecoxy)benzoate, and the like.

Moreover, while reference is hereinafter made, for illustrative purposes, to the production of benzoic acid derivatives, i.e., the compounds represented above by Formula I wherein Ar represents a phenylene radical, the disclosure is also applicable to the corresponding naphthoic acid derivatives. Thus, for instance, compounds represented by the formula:

(IV) 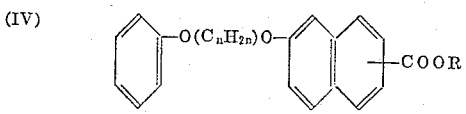

wherein n and R are as defined above, such as 4-(2-phenoxyethoxy)naphthoic acid and methyl 4-(2-phenoxyethoxy)naphthoate, etc., can also be employed as starting materials or precursors.

The phenoxyalkoxybenzoic acids and esters hereinabove described can initially be obtained, for example, by the reaction of a phenoxyalkylhalide with an alkali metal carboxy- or carbo-alkoxy phenolate in accordance with the equation:

(V) 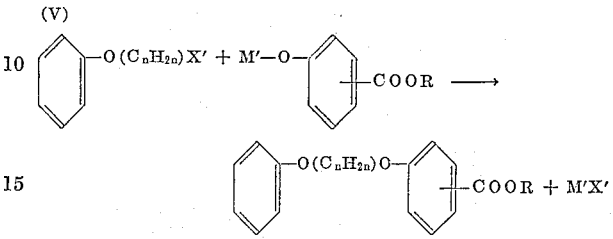

wherein M' designates an alkali metal atom, such as a sodium atom, etc., X' designates a halogen atom, such as a chlorine or bromine atom, etc., and n and R are as defined above. Such a reaction can be carried out by bringing the halide and the phenolate into reactive admixture in a suitable solvent, such as ethanol, N,N-dimethylformamide, dioxane, etc., and at a temperature of from about 20° C. to about 100° C., or higher.

The conversion of the phenoxyalkoxybenzoic acid or ester to the corresponding sulfonic acid derivative represented by the formula:

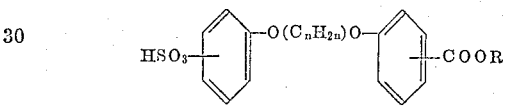

wherein n and R are as defined above, can be carried out by known sulfonation procedures. Thus, for example, the phenoxyalkoxybenzoic acid or ester can be sulfonated by reaction with a mild sulfonating agent comprised of a mixture of sulfuric acid and acetic anhydride, at a temperature of from about −15° C. to about 50° C., and preferably from about 0° C. to about 25° C. The phenoxyalkoxybenzoic acid or ester, of which the latter is preferably employed, is best introduced to the sulfonating agent in solution, using, by way of illustration, an inert solvent such as methylene dichloride, ethylene dichloride, ethyl acetate, or the like. The mole ratio of sulfuric acid to acetic anhydride in the sulfonating agent can vary from about 0.1 to about 1 mole of sulfuric acid per mole of acetic anhydride, with a ratio of from about 0.2 to about 0.6 mole of sulfuric acid per mole of acetic anhydride being preferred. The mole ratio of sulfuric acid to the phenoxyalkoxybenzoic acid or ester can vary from about 0.5 to about 5 moles of sulfuric acid per mole of the phenoxyalkoxybenzoic acid or ester, with a ratio of from about 0.8 to about 1.5 moles of sulfuric acid per mole of the phenoxyalkoxybenzoic acid or ester being preferred.

Produced as hereinabove described, the sulfonated phenoxyalkoxybenzoic acid or ester product can be recovered, if desired, in any convenient maner, such as by crystallization and filtration, by isolation as a residue product upon evaporation or distillation of any solvent present, etc. Moreover, while the para-substituted derivative in which the sulfo radical is located at the 4-position of the phenyl ring is most readily produced, other sulfonated derivatives, i.e., the ortho- or meta-substituted derivatives, are also often formed, or can be obtained by varying the sulfonation reaction in a manner determinable by those skilled in the art in light of this disclosure.

When the starting material employed is the free benzoic acid, i.e., when R of Formula IV is hydrogen, the sulfonated product can readily be converted to the corresponding alkyl carboxylate by esterification in conventional manner with an alkyl alcohol containing from 1 to about 8, and preferably from 1 to about 4 carbon atoms. The presence of the sulfo radical during the esterification serves to catalyze the reaction (auto-catalysis), thus obviating the conventional addition of an esterification catalyst.

The sulfonated phenoxyalkoxybenzoic acid or ester is thereafter reacted with an alkali metal hydroxide or alkoxide, or an alkali metal salt of an acid weaker than sulfonic acid, such as acetic acid or benzoic acid, etc., to form the corresponding alkali metal sulfonate salt, i.e., metallosulfo derivative. Preferably, such a reaction is carried out in an alcoholic or aqueous solution, and at a temperature of from about 5° C. to about 110° C., and preferably from about 20° C. to about 50° C.

The mole ratio of alkali metal hydroxide, alkoxide, or salt to the sulfophenoxyalkoxybenzoic acid or ester can vary from about 1 to about 10 moles of the alkali metal-containing compound per mole of the sulfophenoxyalkoxybenzoic acid or ester, with a ratio of from about 1 to about 2.5 moles of the alkali metal hydroxide, alkoxide, or salt per mole of the sulfophenoxyalkoxybenzoic acid or ester being preferred. Moreover, when the sulfonated product undergoing reaction is the benzoate ester, the conversion of the product to the alkali metal sulfonate derivative can be effected conveniently by titration with alkali metal hydroxide or alkoxide, preferably in alcoholic solution, to a pH of 7 to 8.

The alkali metal sulfonate thus produced can subsequently be recovered in any convenient manner, such as that described above in connection with the recovery of the sulfonic acid derivatives, and thereafter employed to prepare dyeable linear polyesters in accordance with this invention, as hereinbelow described. For convenience, the metallosulfophenoxyalkoxy-substituted aromatic monocarboxylic acids and esters thus produced will hereinafter be referred to as the monofunctional dye-assistants of this invention.

Particularly suitable diols for use in preparing the dyeable linear polyesters of this invention are the acyclic and alicyclic aliphatic glycols containing from 2 to 10 carbon atoms, especially those represented by the general formula $HO(CH_2)_mOH$ wherein $m$ is an integer of from 2 to 10, such as ethylene glycol, trimethylene glycol, pentamethylene glycol, hexamethylene glycol, decamethylene glycol, and the like. Other suitable aliphatic glycols include 1,4-cyclohexanedimethanol, 3-ethyl-1,5-pentanediol, p-xylylene glycol, and the like. It is known that any glycol of an aliphatic nature, whether or not it contains aromatic nuclei, can be used in the production of linear polyesters. Thus, the term aliphatic glycol as employed herein includes all those glycols of acyclic and alicyclic aliphatic nature which are known to the art to be suitable. Still other suitable diols include aliphatic-aromatic diols such as 4-hydroxybenzyl alcohol, aromatic diols such as hydroquinone, etc. Mixtures of two or more diols can also be employed, with up to about 10 mole percent or slightly more of any one diol being replaced by a different diol.

Particularly suitable aromatic dicarboxylic acid compounds for use in producing the dyeable linear polyesters of this invention are the monocyclic aromatic dicarboxylic acids and the dialkyl esters thereof preferably containing from 1 to about 8 carbon atoms in each alkyl ester radical, especially terephthalic acid and the dialkyl esters thereof, such as dimethyl terephthalate and similar esters in which the alkyl ester radicals more preferably contain from 1 to about 4 carbon atoms. Other suitable aromatic dicarboxylic acids and esters include:

isophthalic acid,
p,p'-Diphenylcarboxylic acid,
p,p'-Dicarboxydiphenyl ethane,
p,p'-Dicarboxydiphenyl hexane,
p,p'-Dicarboxydiphenyl sulfide,
p,p'-Dicarboxydiphenyl sulfone,
p,p'-Dicarboxydiphenyl ether,
p,p'-Dicarboxyphenoxy ethane,
2,6-naphthalene dicarboxylic acid; their alkyl esters; and the like.

Mixtures of two or more dicarboxylic acids or esters can also be used, with up to about 10 mole percent or slightly more of any one aromatic dicarboxylic acid or ester being replaced by a different aromatic dicarboxylic acid or ester, or by an aliphatic dicarboxylic acid or ester, such as adipic acid, succinic acid, sebacic acid, dimethyl sebacate, dimethyl 1,2-eicosane dioate, dimethyl bicyclo-[2.2.2]-oct-5-ene dicarboxylate, and the like.

Dyeable linear polyesters can also be prepared by the self-condensation of a hydroxycarboxylic acid or hydroxycarboxylic acid ester together with a monofunctional dye-assistant of this invention, or by the partial replacement of a diol or aromatic dicarboxylic acid or ester with a hydroxycarboxylic acid or ester within the limits hereinabove described.

In preparing the dyeable linear polyesters of this invention, at least about a 1.3 to 1 molar ratio of diol to dicarboxylic acid or ester is used. However, an excess of diol to the dicarboxylic acid compound ranging from about 2 to 10 moles of diol per mole of the dicarboxylic acid compound can also be used. A more satisfactory ratio is from about 1.3 to 7 moles of diol per mole of the dicarboxylic acid compound, with a ratio of from about 1.5 to about 5 moles of diol per mole of dicarboxylic acid compound being especially preferred.

The amount of monofunctional dye-assistant employed in preparing the dyeable linear polyesters of this invention can be varied from about 0.1 to about 3.5 mole percent of the dye-assistant based upon the total amount of dicarboxylic acid compound charged, i.e., as the free acid or as the ester. A preferred ratio is from about 0.15 to about 2.5 mole percent of the dye-assistant based upon the total amount of dicarboxylic acid compound present. While somewhat greater amounts of dye-assistant can also be employed, the use of a proportion greater than about 5 mole percent of the dye-assistant based upon the total amount of dicarboxylic acid compound charged may have an undesirable effect upon the molecular weight of the polyester product.

Moreover, in the formation of a dyeable linear polyester by the reaction of any given dicarboxylic acid or ester with any given diol, especially good results, measurable in terms of improved dyeability, can be obtained in accordance with this invention when from about 0.1 to about 5 mole percent of either the dicarboxylic acid compound or the diol is replaced by one or more different comonomers of similar difunctionality. The comonomer can be any of the dicarboxylic acids or esters, diols or hydroxycarboxylic acids or esters hereinabove described, other than the difunctional monomers conventionally employed in preparing a given polyester, as indicated above. The presence of the comonomer, it is believed, disrupts the crystallinity of the polyester product to a limited extent, thereby making the dye-attractive metallosulfo radicals of the dye-assistant more accessible to dye molecules during subsequent dyeing operations. Higher proportions of comonomer within the ranges hereinabove described can also be employed, although such use is generally attended by little additional advantage insofar as improved dyeability is concerned.

However, as is known to the art, the comonomer can, by appropriate selection, also serve as a dye-assistant, thereby further enhancing the dyeability of the linear polyesters of this invention. As illustrative of the difunctional comonomers which can also serve as a dye-assistant, there can be mentioned the mono-, and di(metallosulfo) fluorenedialkanoic acids and esters represented by the generic formula:

(VII)

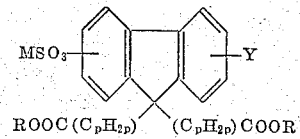

wherein Y, M, and R are as defined above in connection with Formula I and $p$ designates an integer having a value of from 1 to about 12, and preferably from 2 to about 8. As typical thereof, there can be mentioned:

2-(sodiumsulfo)fluorene-9,9-diacetic acid
2-(potassiumsulfo)fluorene-9,9-dipropionic acid
2-(lithiumsulfo)fluorene-9,9-dihexanoic acid
2-(sodiumsulfo)fluorene-9,9-dioctanoic acid
2,7-di(potassiumsulfo)fluorene-9,9-dipropionic acid
Dioctyl 2-(sodiumsulfo)fluorene-9,9-diacetate
Dibutyl 2-(potassiumsulfo)fluorene-9,9-dipropionate
Diethyl 2-(lithiumsulfo)fluorene-9,9-dihexanoate
Dimethyl 2-(sodiumsulfo)fluorene-9,9-dioctanoate
Dimethyl 2,7 - di(potassiumsulfo)fluorene - 9,9-dipropionate, and the like.

Such compounds can be produced by reactions similar to those described above in connection with the production of the monofunctional dye-assistants of this invention, employing as the starting material, a 9,9-fluorenedialkanoic acid or ester represented by the formula:

(VIII)

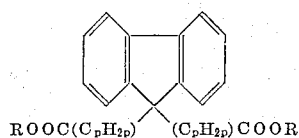

$ROOC(C_pH_{2p})$    $(C_pH_{2p})COOR$ wherein $p$ and $R$ are as defined above.

Another class of difunctional comonomers which can serve as a dye-assistant are the (metallosulfophenoxy) alkoxy-substituted aromatic dicarboxylic acids and esters represented by the formula:

(IX)

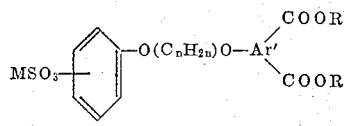

wherein $M$, $n$ and $R$ are as defined above in connection with Formula I and $Ar'$ designates a trivalent arenyl radical, i.e., a trivalent aromatic hydrocarbon radical, such as a phenenyl or naphthenyl radical. As typical thereof, there can be mentioned:

5-(2-[4-((sodiumsulfo))phenoxy]ethoxy)isophthalic acid
5-(3-[4-((potassiumsulfo))phenoxy]propoxy)isophthalic acid
5 - (6 - [4 - ((lithiumsulfo))phenoxy]hexoxy)isophthalic acid
5-(8-[4-((sodiumsulfo))phenoxy]octoxy)isophthalic acid
4-(2-[4-((potassiumsulfo))phenoxy]ethoxy)terephthalic acid
Dioctyl 5-(2[4-((sodiumsulfo))phenoxy]ethoxy) isophthalate
Dibutyl 5-(3-[4-((potassiumsulfo))phenoxy]propoxy) isophthalate
Diethyl 5-(6-[4-((lithiumsulfo))phenoxy]hexoxy) isophthalate
Dimethyl 5-(8-[4-((sodiumsulfo))phenoxy]octoxy) isophthalate
Dimethyl 4 - (2-[4-((potassiumsulfo))phenoxy]ethoxy) terephthalate, and the like.

Such compounds can be produced by reactions similar to those described above in connection with the production of the monofunctional dye-assistants of this invention, employing as the starting material a phenoxyalkoxy-substituted aromatic dicarboxylic acid or ester of the formula:

(X)

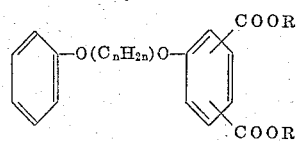

wherein $n$ and $R$ are as defined above. Other difunctional comonomers which can serve as dye-assistants will also occur to those skilled in the art in light of this disclosure, and can be employed in accordance with this invention.

In the practice of this invention, the prescribed amounts of dicarboxylic acid or ester, diol, monofunctional dye-assistant, and catalyst, when desired, are charged to a reactor. When a dicarboxylic acid ester is employed as a reactant, the reaction mixture is heated at a temperature of from about 150° C. to about 270° C., and preferably from about 170° C. to about 260° C., in an inert atmosphere to effect an initial ester interchange reaction. Alternatively, an initial direct esterification can be carried out by employing the free dicarboxylic acid instead of the ester as a reactant. Thereafter, any excess glycol is removed by heating the reaction mixture to a temperature of about 300° C., under reduced pressure in an inert atmosphere, or by passing a stream of an inert gas through the reaction mixture at atmospheric pressure. A polycondensation is then carried out by heating the reaction mixture at a temperature of from about 225° C. to about 325° C., and preferably from about 250° C. to about 290° C., under a reduced pressure of from about 0.1 mm. to about 20 mm. of mercury, and preferably from about 0.1 mm. to about 5 mm. of mercury, in an inert atmosphere. If desired, the entire reaction can be carried out at atmospheric pressure while bubbling a stream of inert gas through the reaction mixture, the rate of gas flow being increased as the polycondensation proceeds. The total reaction period can be from about one to twelve hours, according to the catalyst employed and its concentration, the temperature, the pressure, the starting monomers, the viscosity desired for the polyester product, etc., as is known to the art.

The monomers are preferably reacted in contact with a suitable catalyst in order to shorten the reaction period and thus lessen the possibility of discoloration. Any of the well known polyesterification catalysts can be used, such as antimony oxide, zinc acetate, manganese acetate, cobaltous acetate, zinc succinate, zinc borate, magnesium methoxide, sodium methoxide, barium oxide, cadmium formate, litharge, dibutyltin oxide, tetra-isopropyl titanate, calcium titanium silicate, and the like. Other conventional catalysts can also be employed. The concentration of the catalyst can be varied from about 0.001 to about 1 percent by weight, based upon the total amount of dicarboxylic acid compound charged. A preferred amount is from about 0.005 to about 0.5 percent by weight of catalyst, and more preferably, from about 0.01 to about 0.2 percent by weight of catalyst, based upon the total amount of dicarboxylic acid compound charged. Other materials can also be included in the reaction mixture, as for example, color inhibitors such as alkyl or aryl phosphites; pigments, delusterants or other additives, such as titanium dioxide or barium carbonate; or viscosity stabilizers, etc.

A typical procedure for preparing the polyesters is described, for example, in U.S. 2,465,319, although this procedure can be varied by one skilled in the art in light of this disclosure.

That the monofunctional dye-assistants of this invention could be employed in the preparation of high-melting crystalline, linear polyesters was surprising and unexpected since phenoxyalkoxybenzoic acids and esters, the basic structure of the dye-assistants, ordinarily discolors and/or decomposes when heated to the temperatures employed in making the polyesters. Thus, it was unexpected that the dye-assistants would be sufficiently stable, both chemically and thermally to withstand the polycondensation conditions in the presence of the other reactants, as well as the high temperatures necessary for spinning the polyesters. It was also surprising that the fibers produced from these polyesters showed no disadvantages in physical properties over the unmodified polyester fibers, and that they exhibited greatly enhanced dyeability, as well as many other desirable textile properties. By way of illustration, such fibers are also often desirably delustered or "whitened," and upon dyeing with basic or disperse dyestuffs by standard procedures possess medium to deep shades of color having good wash fastness and light fastness, as well as stability to conventional dry cleaning operations. Fabrics produced from the fibers are also characterized by a desirable "hand" and "wash-and-wear" properties. The improved dyeability of the polyesters is believed due in no small part to the flexibility or rotatability of the metallosulfophenyl radicals of the monofunctional dye-assistants of this invention about the adjacent oxygen atom, thereby making the dye-attractive metallosulfo radicals more accessible to dye during dyeing operations.

At the same time, the monofunctional dye-assistants advantageously also serve as chain-terminators in the polycondensation reaction producing the polyesters, thereby affording effective and convenient control over the molecular weight of the polyester products. The dye-assistants are, in fact, particularly well suited for use as molecular weight regulators in a continuous polycondensation process due to their extremely low volatility. Thus, the compounds are not readily removed from the reaction melt by either vacuum or contact with inert gas which may be passed through the reaction mixture during the polycondensation. Moreover, since the dye-assistants occur in the resulting polyesters only at the end of linear chains due to their monofunctional structure, they do not materially effect the desirable physical properties of the polyesters. Hence, the proportion in which the dye-assistants are employed or incorporated in accordance with this invention to produce polyesters having improved dyeability, i.e., from about 1 to about 3.5 mole percent based upon the total carboxylate content of the polyesters, is ordinarily much less than that in which difunctional dye-assistants, which interrupt the polymer chain are conventionally employed.

The following specific examples serve as further illustration of the present invention. In the examples, the reduced viscosity, ($I_R$), of the dyeable linear polyesters of this invention was determined by dividing the specific viscosity of a solution of the polyester by the concentration of the polyester in the solution. The specific viscosity was determined by dividing the difference between the viscosity of the polyester solution and the viscosity of the solvent by the viscosity of the solvent. In particular, the reduced viscosity of the polyesters was calculated from the equation:

$$I_R = \frac{\Delta N}{N_o} \times \frac{1}{C}$$

wherein $\Delta N$ is the difference between the flow time of the polyester solution and the flow time of the solvent, $N_o$ is the flow time of the solvent, and $C$ is the concentration of the polymer in grams per 100 milliliters of solution. The reduced viscosities were obtained at a polymer concentration of 0.2 gram per 100 milliliters of solution, using a 3-2 mixture of phenol and tetrachloroethane as the solvent. The reduced viscosity of the polyesters can vary from about 0.2 to about 3, with values from about 0.35 to about 1 being preferred.

The dyeable linear polyesters of this invention were melt-spun to form filaments and yarns. Before melt-spinning, the polyesters were dried overnight at a temperature of 90° C. under a reduced pressure of 2 mm. mercury, and then generally melt-extruded in a plunger-type spinning machine at a temperature of from 270° C. to 295° C. using a spinnerette having 30 holes, each 0.015 inch in diameter. The orifice velocity was 3 feet per minute and the yarn was taken up at 150 feet per minute, a draw ratio of 50:1. The yarn was hot-stretched at a temperature of 90° C. around an electrically heated pin to an extent of from 200 to 500 percent, and then continuously annealed at a temperature of 150° C. over an electrically heated bar, allowing 10 percent relaxation. In certain instances, viz., in connection with the dyeable linear polyesters of this invention prepared as described below in Examples III, IV, and V, yarn was melt-spun from the polyesters at a temperature of 285° C., using a screw-extruder spinning machine with an orifice velocity of 16.6 feet per minute. The yarn was taken up at 3,500 feet per minute and hot-stretched to an extent of from 100 to 400 percent over a heated pin and platen combination at temperatures of 80° C. and 150° C., respectively, and then annealed at a temperature of 150° C., allowing 6 percent relaxation. The yarns were thereafter woven into fabrics and dyed. The spinning procedures used are conventional for polyesters, and are well known to the art.

The fabrics were dyed by standard procedures in the absence of, and using dye-carriers. The dye baths used had a liquor-to-fiber bath ratio of 40:1 and, based upon the weight of the fabric to be dyed, contained 1 percent by weight of nonyl phenyl polyethylene glycol ether in the case of a basic dyebath, and 1 percent by weight of sodium N-methyl-N-oleoyltaurate in the case of a disperse dyebath. The dye concentration was 3 percent by weight based on the weight of the fabric.

In a typical dyeing procedure, the various components of the dyebath were admixed and made up to volume with distilled water. The dyestuff was introduced as a paste in 0.25 percent by weight of acetic acid, based upon the weight of the fabric to be dyed. The fabric was scoured in a commercially available washer and dried in a commercially available washer and dried in a commercially available drier. About 5 to 10 grams of the fabric was added to the dyebath, and the temperature of the bath was raised to the boil over a period of 15 minutes, and held at the boil for an additional period of 90 minutes. The dyed fabric was then rinsed in warm water and scoured in an aqueous solution containing 1 percent by weight of a commercially available alkyl phenyl polyethylene glycol ether surfactant and 0.25 percent by weight of soda ash, based upon the weight of the fabric, at a temperature of 60° C. for a period of 15 minutes. The dyed and scoured fabric was finally rinsed in water and air dried.

Among the basic and disperse dyestuffs which readily dye the fibers produced from the polyesters of this invention, one can mention the "Genacryl" dyes discussed on pages 432 to 433 of the American Dyestuff Reporter, volume 43, 1954, for example, Genacryl Red 6B (Basic Violet 7, Color Index No. 48020); Genacryl Pink G (Basic Red 13, Color Index No. 48015); Genacryl Blue 6G (Basic Blue 1, Color Index No. 42025); Celliton Fast Red GGA Ex. Conc. (Disperse Red 17, Color Index No. 11210); Celliton Fast Blue AF Ex. Conc. (Disperse Blue 9, Color Index No. 61115); Fuchsine SPC (Basic Red 9, Color Index No. 42500); Fuchsine Conc. (Basic Violet 14, Color Index No. 42510); Methyl Violet 2B (Basic Violet 1, Color Index No. 42535); Methylene Blue SP (Basic Blue 9, Color Index No. 52015); Victoria Green (Basic Green 4, Color Index No. 42000); Rhodamine B (Basic Violet 10, Color Index No. 45170); Sevron Yellow R (Basic Yellow 11, Color Index No. 48055); Celliton Fast Pink BA (Disperse Red 15, Color Index No. 60710); Latyl Blue FL; Maxilon Red BL; Sevron Brilliant Red 4G (Basic Red 14); Sevron Blue 5G (Basic Blue 4, Color Index No. 51004); and the like.

*Example I*

A mixture of 175 grams of dimethyl terephthalate, 6.9 grams of methyl 3-(2-[4-((sodiumsulfo))phenoxy]ethoxy)benzoate, 180 grams of ethylene glycol, 0.063 gram of zinc acetate, and 0.018 gram of antimony oxide was charged to a reactor and heated at a temperature of from 183° C. to 186° C. for a period of 6.5 hours to bring about an ester exchange, while distilling the methanol formed during the reaction. The reaction mixture was then heated to a temperature of 265° C. for a period of 2 hours to remove the glycol excess. Thereafter, the temperature of the reaction mixture was maintained in the range of from 261° C. to 265° C. for a period of 6.5 hours to carry out a polycondensation. During the reaction, a vigorous stream of nitrogen was passed through the reaction mixture at atmospheric pressure. A white, crystalline polyester was thereby obtained, having a reduced viscosity of 0.57 and a melting point of 250° C. The polyester possessed excellent dyeable fiber-forming and cold-drawing properties. Fibers melt-spun from this polyester had a stiffness of 3.7 grams per denier at a temperature of 200° C. The fibers were dyed to a medium shade with Genacryl Pink G and Sevron Blue 5G, and to a deep shade with Celliton Fast Red GGA Ex. Conc. without the use of a carrier. By way of comparison, a polyester was prepared in a manner similar to that described above in this example from dimethyl terephthalate and ethylene glycol, modified, however, with 1.9 mole percent of the ethylene glycol ester of p-sodiumsulfobenzoic acid based upon the total carboxylate content of the polyester instead of the monofunctional dye-assistant of this invention. Fibers melt-spun from this polyester were not dyed to any significant extent by Genacryl Pink G, and were dyed to only a very light shade with Celliton Fast Red GGA Ex. Conc.

*Example II*

A mixture of 175 grams of dimethyl terephthalate, 2.8 grams of dimethyl sebacate, 6.3 grams of methyl 3-(2-[4-((sodiumsulfo))phenoxy]ethoxy)benzoate, 180 grams of ethylene glycol, 0.062 gram of zinc acetate, and 0.018 gram of antimony oxide was charged to a reactor and heated at a temperature of from 184° C. to 187° C. for a period of 5.5 hours to bring about an ester exchange, while distilling the methanol formed during the reaction. The reaction mixture was then heated to a temperature of 265° C. for a period of 1.75 hours to remove the glycol excess. Thereafter, the temperature of the reaction mixture was maintained in the range of from 265° C. to 268° C. for a period of 5.5 hours to carry out a polycondensation. During the reaction, a vigorous stream of nitrogen was passed through the reaction mixture at atmospheric pressure. A white, crystalline polyester was thereby obtained, having a reduced viscosity of 0.55. The polyester possessed excellent dyeable fiber-forming and cold-drawing properties. Fibers melt-spun from this polyester were dyed to a medium shade with Genacryl Pink G and Sevron Blue 5G, and to a deep shade with Celliton Fast Red GGA Ex. Conc. without the use of a carrier. By way of comparison, fibers melt-spun from a polyethylene terephthalate polyester, i.e., excluding the monofunctional dye-assistant of this invention, were not dyed by Genacryl Pink G or Sevron Blue 5G, and were dyed to only a very light shade with Celliton Fast Red GGA Ex. Conc.

*Example III*

A mixture of 2720 grams of dimethyl terephthalate, 120 grams of methyl 3-(2-[4-((sodiumsulfo))phenoxy]-ethoxy)benzoate, 2250 grams of ethylene glycol, 0.42 gram of antimony oxide, and 1.26 gram of zinc acetate was charged to a reactor. The reaction mixture was heated to a temperature of 200° C. over a period of 1 hour, and maintained at this temperature for an additional period of 1 hour to bring about an ester exchange, while distilling the methanol formed during the reaction. The reaction mixture was then heated to a temperature of 270° C. for a period of 2 hours to remove the glycol excess. After most of the excess glycol had been removed, the pressure was reduced to 3 mm. of mercury. Thereafter, the temperature of the reaction mixture was maintained in the range of from 270° C. to 275° C. for a period of 4.5 hours to carry out a polycondensation. During the reaction, a vigorous stream of nitrogen was passed through the reaction mixture. A colorless, crystalline polyester was thus obtained, having a reduced viscosity of 0.46 and a melting point of 250° C. The polyester was characterized by excellent dyeable fiber-forming and cold-drawing properties. Fibers melt-spun from this polyester evidence the following physical properties:

| | |
|---|---|
| Denier | 112 |
| Tenacity grams per denier | 3.2 |
| Shrinkage in boiling water percent | 3.5 |
| Dry stiffness at 25° C. grams per denier | 97 |
| Dry stiffness at 200° C. do | 4.5 |
| Wet stiffness at 70° C. do | 47 |

The fibers were dyed to medium to deep shades with the following dyes without the use of a carrier: Celliton Fast Red GGA, Latyl Blue FL, Celliton Fast Pink BA, Sevron Blue 5G, Sevron Yellow R and Maxilon Red BL. By way of comparison, fibers melt-spun from a polyethylene terephthalate polyester, i.e., excluding the monofunctional dye-assistant of this invention, were not dyed by Sevron Blue 5G, Sevron Yellow R and Maxilon Red BL, and were dyed to only very light shades with Celliton Fast Red GGA, Latyl Blue FL and Celliton Fast Pink BA.

*Example IV*

A mixture of 2330 grams of dimethyl terephthalate, 208 grams of dimethyl isophthalate, 100 grams of methyl 3 - (2 - [4 - ((sodiumsulfo))phenoxy]ethoxy)benzoate, 2150 grams of ethylene glycol, 1.18 grams of zinc acetate, and 0.39 gram of antimony oxide was charged to a reactor. The reaction mixture was heated to a temperature of 200° C. over a period of 1.25 hours, and maintained at this temperature for an additional period of 1 hour to bring about an ester exchange, while distilling the methanol formed during the reaction. The reaction mixture was then heated at a temperature of 265° C. to remove the glycol excess. Thereafter, the temperature of the reaction mixture was maintained in the range of from 265° C. to 270° C. at a pressure of 5 mm. of mercury for a period of 4 hours to carry out a polycondensation. During the reaction, a vigorous stream of nitrogen was passed through the reaction mixture. A white, crystalline polyester was thus obtained, having a reduced viscosity of 0.50 and a melting point of 229° C. The polyester was characterized by excellent dyeable fiber-forming and cold-drawing properties. Fibers melt-spun from this polyester evidenced the following physical properties:

| | |
|---|---|
| Denier | 165 |
| Tenacity grams per denier | 2.1 |
| Elongation percent | 15 |
| Shrinkage in boiling water do | 6.6 |
| Dry stiffness at 25° C. grams per denier | 67 |
| Wet stiffness at 70° C. do | 19 |

The fibers were dyed to deep shades with each of the dyes described above in Example III without the use of a carrier. By way of comparison, fibers melt-spun from a polyester condensation product of ethylene glycol with 90 mole percent of terephthalic acid and 10 mole percent of isophthalic acid, i.e., excluding the monofunctional dye-assistant of this invention, were not dyed by Genacryl Pink G and Maxilon Red BL, and were dyed to only a very light shade with Celliton Fast Red GGA Ex. Conc.

*Example V*

A mixture of 2330 grams of dimethyl terephthalate, 180 grams of dimethyl sebacate, 90 grams of methyl 3 - (2 - [4 - ((sodiumsulfo))phenoxy]ethoxy)benzoate, 2000 grams of ethylene glycol, 0.39 gram of antimony oxide, and 1.17 grams of zinc acetate was charged to a reactor. The reaction mixture was heated to a temperature of 200° C. over a period of 1 hour, and maintained at this temperature for an additional period of 1 hour to bring about an ester exchange, while distilling the methanol formed during the reaction. The reaction mixture was then heated to a temperature of 265° C. to remove the glycol excess. Thereafter, the temperature of the reaction mixture was maintained in the range of from 265° C. to 270° C. at a pressure of 4 mm. of mercury for a period of 4 hours to carry out a polycondensation. During the reaction, a vigorous stream of nitrogen was passed through the reaction mixture. A white, crystalline polyester was thus obtained, having a reduced viscosity of 0.54 and a melting point of 235° C. The polyester was characterized by excellent dyeable fiber-forming and cold-drawing properties. Fibers melt-spun from this polyester evidenced the following physical properties:

| | |
|---|---|
| Denier | 148 |
| Tenacity grams per denier | 3.3 |
| Elongation percent | 11.5 |
| Shrinkage in boiling water do | 7.6 |
| Dry stiffness at 25° C. grams per denier | 80 |
| Wet stiffness at 70° C. do | 21 |

The fibers were dyed to deep shades with each of the dyes described above in Example III without the use of a carrier.

*Example VI*

A mixture of 155 grams of dimethyl terephthalate, 6.57 grams of methyl 2-(2-[4-((sodiumsulfo))phenoxy]ethoxy)benzoate, 127 grams of ethylene glycol, 0.975 grams of zinc acetate, and 0.025 gram of antimony oxide was charged to a reactor and heated at a temperature of from 210° C. to 213° C. for a period of 3 hours to bring about an ester exchange, while distilling the methanol formed during the reaction. The reaction mixture was then heated at a temperature of from 213° C. to 236° C. for a period of 1.5 hours to remove the glycol excess. Thereafter, the temperature of the reaction mixture was maintained in the range of from 276° C. to 280° C. for a period of 5.5 hours to carry out a polycondensation. During the reaction, a vigorous stream of nitrogen was passed through the reaction mixture at atmospheric pressure. A white, crystalline polyester was thus obtained, having a reduced viscosity of 0.77 and a melting point of 249–250° C. The polyester was characterized by excellent dyeable fiber-forming and cold-drawing properties. Fibers melt-spun from this polyester were dyed to a deep shade with Celliton Fast Red GGA and to a medium shade with Sevron Blue 5G without the use of a carrier. Similarly dyeable fibers are also obtained from the polyester prepared as described above in this example, employing butyl 3-(2-[4-((sodiumsulfo))phenoxy]ethoxy)benzoate as the monofunctional dye-assistant of this invention.

*Example VII*

A mixture of 30 grams of dimethyl terephthalate, 1.2963 grams of methyl 2-(2-[4-((potassiumsulfo))phenoxy]ethoxy)benzoate, 25 grams of ethylene glycol, 0.0141 gram of zinc acetate, and 0.0047 gram of antimony oxide was charged to a reactor and heated at a temperature of from 207° C. to 215° C. for a period of 2.75 hours to bring about an ester exchange, while distilling the methanol formed during the reaction. The reaction mixture was then heated at a temperature of from 210° C. to 231° C. for a period of 0.75 hour to remove the glycol excess. Thereafter, the temperature of the reaction mixture was maintained in the range of from 270° C. to 280° C. for a period of 4 hours to carry out a polycondensation. During the reaction, a vigorous stream of nitrogen was passed through the reaction mixture at atmospheric pressure. A white, crystalline polyester was thus obtained, having a reduced viscosity of 0.48 and a melting point of 252–254° C. The polyester was characterized by excellent dyeable fiber-forming and cold-drawing properties. Dyeable fibers melt-spun from this polyester exhibited a cold-raw of from 450 to 500 percent, and were tough and pliable. Dyeable fibers are also obtained from the polyester prepared as described above in this example, employing butyl 2-(2-[4-((lithiumsulfo))phenoxy]ethoxy)benzoate as the monofunctional dye-assistant of this invention.

*Example VIII*

A mixture of 155 grams of dimethyl terephthalate, 13.81 grams of dimethyl isophthalate, 6.97 grams of methyl 2-(2-[4-((sodiumsulfo))phenoxy]ethoxy)benzoate, 138 grams of ethylene glycol, 0.07 gram of zinc acetate, and 0.018 gram of antimony oxide was charged to a reactor and heated at a temperature of from 197° C. to 205° C. for a period of 2.25 hours to bring about an ester exchange, while distilling the methanol formed during the reaction. The reaction mixture was then heated at a temperature of from 225° C. to 233° C. for a period of 1 hour to remove the glycol excess. Thereafter, the temperature of the reaction mixture was maintained in the range of 270° C. to 280° C. for a period of 5.67 hours to carry out a polycondensation. During the reaction, a vigorous stream of nitrogen was passed through the reaction mixture at atmospheric pressure. A white, crystalline polyester was thus obtained, having a reduced viscosity of 0.69 and a melting point of 229–231° C. The polyester was characterized by excellent dyeable fiber-forming and cold-drawing properties. Fibers melt-spun from this polyester were dyed to deep shades with Celliton Fast Red GGA and Sevron Blue 5G without the use of a carrier.

*Example IX*

A mixture of 155 grams of dimethyl terephthalate, 12.04 grams of dimethyl sebacate, 7.62 grams of methyl 4-(5-[4-((sodiumsulfo))phenoxy]pentoxy)benzoate, 135 grams of ethylene glycol, 0.07 gram of zinc acetate, and 0.017 gram of antimony oxide was charged to a reactor and heated at a temperature of from 205° C. to 207° C. for a period of 2 hours to bring about an ester exchange, while distilling the methanol formed during the reaction. The reaction mixture was then heated at a temperature of from 225° C. to 234° C. for a period of 1 hour to remove the glycol excess. Thereafter, the temperature of the reaction mixture was maintained in the range of from 260° C. to 273° C. for a period of 5.75 hours to carry out a polycondensation. During the reaction, a vigorous stream of nitrogen was passed through the reaction mixture at atmospheric pressure. A white, crystalline polyester was thus obtained, having a reduced viscosity of 0.49 and a melting point of 232–234° C. The polyester was characterized by excellent dyeable fiber-forming and cold-drawing properties. Fibers melt-spun from this polyester were dyed to deep shades with Celliton Fast Red GGA and Sevron Blue 5G without the use of a carrier. Simiarly dyeable fibers are also obtained from the polyester prepared as described above in this example, employing ethyl 4-(8-[4-((potassiumsulfo))phenoxy]octoxy)benzoate as the monofunctional dye-assistant of this invention.

*Example X*

A mixture of 30 grams of dimethyl terephthalate, 1.96 grams of dimethyl isophthalate, 1.35 grams of methyl 4-(5-[4-((lithiumsulfo))phenoxy]pentoxy)benzoate, 26 grams of ethylene glycol, 0.012 gram of zinc acetate, and 0.003 gram of antimony oxide was charged to a reactor and heated at a temperature of from 187° C. to 209° C. for a period of 2.5 hours to bring about an ester exchange, while distilling the methanol formed during the reaction. The reaction mixture was then heated at a temperature of from 271° C. to 272° C. for a period of 0.5 hour to remove the glycol excess. Thereafter, the temperature of the reaction mixture was maintained in the range of from 270° C. to 271° C. for a period of 6.25 hours to carry out a polycondensation. During the reaction, a vigorous stream of nitrogen was passed through the reaction mixture at atmospheric pressure. A white, crystalline polyester was thus obtained, having a reduced viscosity of 0.35 and a melting point of 228–230° C. The polyester was characterized by excellent dyeable fiber-forming and cold-drawing properties. Dyeable fibers melt-spun from this polyester were tough and pliable, and exhibited a cold-draw of between 250 and 300 percent.

Example XI

A mixture of 30 grams of dimethyl terephthalate, 1.098 gram of dimethyl 2-(potassiumsulfo)fluorene-9,9-dipropionate, 1.155 gram of methyl 4-(5-[4-((lithiumsulfo))phenoxy]pentoxy)benzoate, 25 grams of ethylene glycol, 0.012 gram of zinc acetate and 0.003 gram of antimony oxide was charged to a reactor and heated at a temperature of from 184° C. to 211° C. for a period of 2.33 hours to bring about an ester exchange, while distilling the methanol formed during the reaction. The reaction mixture was then heated at a temperature of from 211° C. to 278° C. for a period of 0.5 hour to remove the glycol excess. Thereafter, the temperature of the reaction mixture was maintained in the range of from 277° C. to 284° C. for a period of 2.75 hours to carry out a polycondensation. During the reaction, a vigorous stream of nitrogen was passed through the reaction mixture at atmospheric pressure. A crystalline polyester was thus obtained, having a melting point of 233–234° C. The polyester was characterized by excellent dyeable, fiber-forming and cold-drawing fibers. Dyeable fibers melt-spun from this polyester were tough and pliable, and exhibited a cold-draw of between 450 and 500 percent. This example illustrates the use of a difunctional comonomer which is also a dye-assistant.

Example XII

A mixture of 30 grams of dimethyl terephthalate, 2.326 grams of dimethyl sebacate, 1.402 gram of methyl 4-(5-[4 - ((sodiumsulfo))phenoxy]pentoxy)benzoate, 86.4 grams of a 70 percent by weight solution of 1,4-cyclohexanedimethanol in methanol, and 2 cubic centimeters of an 11.4 percent by weight solution of $NaHTi(OC_4H_9)_6$ in butanol was charged to a reactor and heated at a temperature of from 234° C. to 243° C. for a period of 1 hour to bring about an ester exchange, while distilling the methanol formed during the reaction. The reaction mixture was then heated at a temperature of from 271° C. to 305° C. at a pressure of <1 mm. of mercury for a period of 4.33 hours to remove the glycol excess and carry out a polycondensation. During the reaction, a vigorous stream of nitrogen was passed through the reaction mixture. A crystalline polyester was thus obtained, having a melting point of 260–262° C. The polyester was characterized by excellent dyeable fiber-forming and cold drawing properties.

Example XIII

A mixture of 30 grams of dimethyl terephthalate, 1.12 gram of methyl 2-(2[4-((potassiumsulfo))pentoxy]ethoxy)benzoate, 0.821 gram of dimethyl 5-(2-[4-((sodiumsulfo))phenoxy]ethoxy)isophthalate, 25 grams of ethylene glycol, 0.012 gram of zinc acetate, and 0.003 gram of antimony oxide was charged to a reactor and heated at a temperature of from 186° C. to 212° C. for a period of 2 hours to bring about an ester exchange, while distilling the methanol formed during the reaction. The reaction mixture was then heated at a temperature of from 263° C. to 271° C. for a period of 0.5 hour to remove the glycol excess. Thereafter, the temperature of the reaction mxture was maintained in the range of from 271° C. to 275° C. for a period of 6 hours to carry out a polycondensation. During the reaction, a vigorous stream of nitrogen was passed through the reaction mixture at atmospheric pressure. A white, crystalline polyester was thus obtained, having a reduced viscosity of 0.47 and a melting point of 258–260° C. The polyester was characterized by excellent dyeable fiber-forming and cold-drawing properties. Dyeable fibers melt-spun from this polyester were tough and pliable, and exhibited a cold-draw of 300 percent.

The following experiments illustrate the preparation of several of the monofunctional dye-assistants of this invention. Similar procedures can be used to produce the others.

EXPERIMENT A

To 150 milliliters of absolute ethanol, contained in a 500 milliliter 4-necked flask equipped with a stirrer, thermometer and condenser, there were slowly added 11.5 grams of sodium metal, at room temperature. The resulting solution was heated to a temperature of 80° C. to dissolve all of the sodium present. Thereafter, by means of a dropping funnel, 76.07 grams of methyl 3-hydroxybenzoate dissolved in 150 milliliters of absolute ethanol were slowly added to the contents of the flask over a 30-minute period, and at a temperature maintained at 50° C., accompanied by continued stirring. In this manner, an ethanol solution of methyl 3-(sodiumoxy)benzoate was obtained. This solution was then slowly introduced over a 1-hour period into a similar apparatus containing 100 milliliters of a refluxing ethanol solution in which there were dissolved 100.54 grams of phenoxyethylbromide, at a temperature of 80° C. Reflux of the reaction mixture was continued at a temperature of 80° C. for a period of 17.75 hours. The pH of the mixture measured at the beginning of the reflux period was 11.5; at the conclusion thereof, the pH was 10.0. A sodium bromide precipitate was formed. The reaction mixture was then cooled to room temperature and filtered. The filter cake was dissolved in hot ethanol and refiltered to remove 23 grams of sodium bromide. The filtrate was thereafter cooled to 0° C. to precipitate the desired product. Finally, this precipitated product was recovered by filtration, and dried in a vacuum oven. In this manner, 100 grams of methyl 3-(2-phenoxyethoxy)benzoate were obtained as a white, crystalline product having a melting point of 62° C. Analysis.—Calculated for $C_{16}H_{16}O_4$: C, 70.57; H, 5.93. Found: C, 69.98; H, 6.18.

To an apparatus similar to that described above, there were charged 59 grams of acetic anhydride. The anhydride was cooled to −5° C., whereupon 28 grams of sulfuric acid were added dropwise thereto, accompanied by stirring and continued cooling, so that the temperature of the resulting mixture was maintained in the range of from −5° C. to 0° C. To this mixture there was slowly added a solution containing 70 grams of methyl 3-(2-phenoxyethoxy)benzoate, obtained as described above, dissolved in 200 grams of ethylene dichloride. After stirring the resulting solution for a period of 4 hours at a temperature maintained in the range of from −5° C. to 0° C., the solution was gradually warmed to room temperature. Thereafter, 200 milliliters of methanol were added to the solution, which was then refluxed for several minutes to esterify the acid present, including the acetic anhydride component of the sulfonating agent. The solution was subsequently transferred to an evaporating dish, from which the solvent present was evaporated upon standing overnight. In this manner, methyl 3-(2-[sulfophenoxy]ethoxy)benzoate was obtained as a residue product. The residue was then dissolved in 300 milliliters of methanol, transferred to a 500 milliliter flask, and refluxed for a period of 5 hours, while distilling off a small amount of methyl acetate and any trace of ethylene dichloride still present. During the distillation, methanol was added to the solution to maintain a constant volume of about 400 milliliters. Thereafter, the solution was cooled to about room temperature and titrated with methanolic sodium hydroxide to a pH of 7.2. A precipitate was formed and was filtered and purified by extraction with methanol in a Soxhlet extractor. In this manner, 45 grams of methyl 3 - (2-[4-((sodiumsulfo))phenoxy]ethoxy)benzoate, having a melting point of 355–358° C., were obtained. Analysis.—Calculated for $C_{16}H_{15}O_7SNa$: C, 51.33; H, 4.04. Found: C, 51.02; H, 4.16. Infrared analysis was consistent with the identity of the product. In addition, 59 grams of this product was isolated and recovered as a residue product from the methanol extractant. In like manner, butyl 3-(2-[4-((lithiumsulfo))phenoxy]ethoxy)benzoate is produced by the sulfonation of butyl 3-(2- phenoxyethoxy)-benzoate, followed by titration with lithium hydroxide.

EXPERIMENT B

To 2.5 liters of absolute ethanol, contained in a 5 liter, 4-necked flask equipped with a stirrer, thermometer and condenser, there were slowly added 92 grams of sodium metal, at room temperature. Thereafter, by means of a dropping funnel, 609 grams of methyl 2-hydroxybenzoate were slowly added to the contents of the flask over a 30-minute period, at room temperature, acompanied by by continued stirring. In this manner, a methyl 2-(sodiumoxy)benzoate precipitate was formed. 800 milliliters of an ethanol solution in which there were dissolved 880 grams of phenoxyethylbromide was then added to the reaction mixture at room temperature, accompanied by continued stirring, to form a thick slurry. The slurry was heated to a temperature of 80° C., at which temperature, solution occurred, and a reflux point was reached. Reflux of the reaction mixture was continued at this temperature for a period of 30 hours. The pH of the mixture measured at the beginning of the reflux period was 12.5; at the conclusion thereof, the pH was 10.4. A sodium bromide precipitate was formed, and was removed by filtering the reaction mixture while hot. The reaction mixture was then cooled to room temperature to precipitate the desired product, and filtered. The filter cake was dissolved in heptane and refiltered to remove any sodium bromide still present. Finally, the product was recovered by filtration, and dried in a vacuum oven. In this manner, 668 grams of methyl 2-(2-phenoxyethoxy)benzoate were obtained as a white crystalline product having a melting point of 73–75° C.

To an apparatus similar to that described above there were charged 546 grams of acetic anhydride. The anhydride was cooled to a temperature of —10° C., whereupon 249 grams of sulfuric acid were added dropwise thereto, accompanied by stirring and continued cooling, so that the temperature of the resulting mixture was maintained in the range of from —10° C. to 0° C. To this mixture there was slowly added a solution containing 662 grams of methyl 2-(2-phenoxyethoxy)benzoate, obtained as described above, dissolved in 2100 grams of ethylene dichloride. After stirring the resulting solution for 5 hours at a temperature maintained in the range of from 0° C. to 5° C., the solution was gradually warmed to room temperature. Thereafter, 2000 milliliters of methanol were added to the solution, which was then refluxed for several minutes to esterify the acid present. The solution was subsequently transferred to an evaporating dish, from which the solvent present was evaporated upon standing overnight. In this manner, methyl 2-(2-[4-sulfophenoxy]ethoxy)benzoate was obtained as a residue product. The residue was then dissolved in 2000 milliliters of methanol, transferred to a 2-liter flask, and refluxed for a period of 5 hours, while distilling off methyl acetate and any trace of ethylene dichloride still present. During the distillation, methanol was added to the solution to maintain a constant volume of about 3000 milliliters. Thereafter, the solution was cooled to about room temperature, and 2563 grams of the solution was titrated with methanolic sodium hydroxide to a pH of 7.7. A precipitate was formed and was filtered and purified by extraction with methanol in a Soxhlet extractor. In this manner, 288 grams of methyl 2-(2-[4-((sodiumsulfo))phenoxy]ethoxy)benzoate, having a melting point above 400° C. were obtained. Infrared analysis was consistent with the identity of the product. In similar manner, another 200 grams of the methanol solution of methyl 2-(2-[4-sulfophenoxy]ethoxy)benzoate, obtained as described above, were titrated with methanolic potassium hydroxide to a pH of 7.8, and the resulting precipitate filtered and purified to yield 40 grams of methyl 2-(2-[4-((potassiumsulfo))phenoxy]ethoxy)benzoate. Infrared analysis was again consistent with the identity of the product. In like manner, butyl 2-(2-[4-((lithiumsulfo))phenoxy]ethoxy)benzoate is produced by the sulfonation of butyl 2-(2-phenoxyethoxy)benzoate, followed by titration with lithium hydroxide.

EXPERIMENT C

To 500 milliliters of anhydrous ethanol, contained in a 2-liter, 4-necked flask equipped with a stirrer, thermometer and condenser, there were slowly added 18.9 grams of sodium metal, at room temperature. Thereafter, by means of a dropping funnel, 125.06 grams of methyl 4-hydroxybenzoate dissolved in 500 milliliters of anhydrous methanol were slowly added to the contents of the flask over a 5-minute period, at room temperature, accompanied by continued stirring. In this manner, an ethanol solution of methyl 2-(sodiumoxy)benzoate was obtained. This solution was then heated to reflux at a temperature of 65° C., and 200 grams of phenoxypentylbromide were slowly added thereto by means of a dropping funnel over a 15-minute period. Reflux of the reaction mixture was continued at a temperature of 65° C. for a period of 30 hours. The pH of the mixture measured at the beginning of the reflux period was 12.0; at the conclusion thereof, the pH was 8.2. A sodium bromide precipitate was formed. The reaction mixture was then distilled to remove the methanol present. The residue was dissolved in diethyl ether and filtered to remove the sodium bromide present, which remained as a precipitate. The ether was evaporated and the residue was dissolved in heptane and refiltered to remove any trace of sodium bromide still present. The filtrate was then cooled to room temperature to precipitate the desired product. Finally the product was recovered by filtration, and dried in a vacuum oven. In this manner, 227 grams of methyl 4-(5-phenoxypentoxy)benzoate were obtained as a white, crystalline product having a melting point of 64° C. *Analysis.*—Calculated for $C_{19}H_{22}O_4$: C, 72.6; H, 7.07. Found: C, 70.91; H, 6.98. Infrared analysis was consistent with the identity of the product.

To an apparatus similar to that described above, there were charged 161 grams of acetic anhydride. The anhydride was cooled to a temperature of —10° C., whereupon 73.6 grams of sulfuric acid were added dropwise thereto, accompanied by stirring and continued cooling, so that the temperature of the resulting mixture was maintained in the range of from —10° C. to —5° C. To this mixture there was slowly added a solution containing 225 grams of methyl 4-(5-phenoxypentoxy)benzoate, obtained as described above, dissolved in 500 grams of ethylene dichloride. After stirring the resulting solution for 5 hours at a temperature maintained in the range of from 0° C. to 5° C., the solution was gradually warmed to room temperature. Thereafter, 1 liter of methanol was added to the solution, which was then refluxed at a temperature of 64° C. for a period of 2 hours to esterify the acid present. The solution was subsequently transferred to an evaporating dish, from which the solvent present was evaporated upon standing overnight. In this manner, methyl 4-(5-[4-sulfophenoxy]pentoxy)benzoate was obtained as a residue product. The residue was then dissolved in 1 liter of methanol, transferred to a flask, and refluxed for a period of 5 hours while distilling off methyl acetate and any trace of ethylene dichloride still present. During the distillation, methanol was added to the solution to maintain a constant volume of about 1.5 liters. Thereafter, the solution was cooled to about room temperature, and 1006 grams of the solution was titrated with methanolic sodium hydroxide to a pH of 8.2. A precipitate was formed and was recovered by filtration. In this manner, 194 grams of methyl 4-(5-[4-((sodiumsulfo))phenoxy]pentoxy)benzoate were obtained. Infrared analysis was consistent with the identity of the product. In similar manner, another 500 grams of the methanol solution of methyl 4-(5-[4-sulfophenoxy]pentoxy)benzoate, obtained as described above, were titrated with methanolic lithium hydroxide to a pH of 7.6. Upon distillation of the methanol present, a white solid formed, and was dried in a vacuum oven to yield 90 grams of methyl 4-(5-[4-((lithiumsulfo))-phenoxy]pentoxy)benzoate. *Analysis.*—Calculated for $C_{19}H_{21}O_7Li \cdot H_2O$: C, 54.54; H, 5.53. Found: C, 54.62; H, 5.40. Infrared analysis was again consistent with the identity of the product. In like manner, ethyl 4-(8-[4-((potassiumsulfo))phenoxy]octoxy)benzoate is produced by the sulfonation of ethyl 4-(8-phenoxyoctoxy)benzoate, followed by titration with potassium hydroxide.

What is claimed is:

1. A dyeable linear polyester consisting essentially of the condensation product of (a) a dicarboxylic acid compound selected from the group consisting of the monocyclic aromatic dicarboxylic acids and the dialkyl esters thereof; (b) an aliphatic glycol containing from 2 to 10 carbon atoms; and, based upon the total amount of said dicarboxylic acid compound, (c) from about 0.1 to about 3.5 mole percent of a compound of the formula:

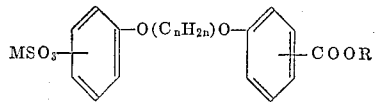

wherein M is an alkali metal, n is an integer of from 1 to 12, and R is selected from the group consisting of hydrogen and alkyl.

2. A dyeable linear polyester consisting essentially of the condensation product of (a) dimethyl terephthalate; (b) a compound of the formula:

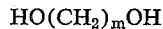

$$HO(CH_2)_mOH$$

wherein m is an integer of from 2 to 10; and, based upon the total amount of said dimethyl terephthalate, (c) from about 0.1 to about 3.5 mole percent of a compound of the formula:

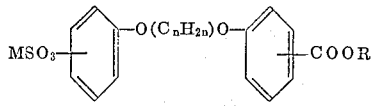

wherein M is an alkali metal having an atomic number of from 3 to 19, n is an integer of from 2 to 8, and R is methyl.

3. A dyeable linear polyester consisting essentially of the condensation product of (a) dimethyl terephthalate; (b) ethylene glycol; and, based upon the total amount of said dimethyl terephthalate, (c) from about 0.1 to about 3.5 mole percent of a compound of the formula:

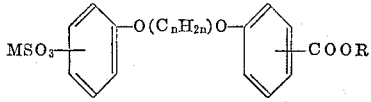

wherein M is an alkali metal having an atomic number of from 3 to 19, n is an integer of from 2 to 8, and R is methyl.

4. A dyeable linear polyester consisting essentially of the condensation product of (a) dimethyl terephthalate; (b) ethylene glycol; and, based upon the total amount of said dimethyl terephthalate, (c) from about 0.15 to about 2.5 mole percent of methyl 3-(2-[4-((sodiumsulfo))phenoxy]ethoxy)benzoate.

5. A dyeable linear polyester consisting essentially of the condensation product of (a) dimethyl terephthalate; (b) ethylene glycol; and, based upon the total amount of said dimethyl terephthalate, (c) from about 0.15 to about 2.5 mole percent of methyl 2-(2-[4-((potassiumsulfo))phenoxy]ethoxy)benzoate.

6. A dyeable linear polyester consisting essentially of the condensation product of (a) dimethyl terephthalate; (b) ethylene glycol; and, based upon the total amount of said dimethyl terephthalate, (c) from about 0.15 to about 2.5 mole percent of methyl 4-(5-[4-((lithiumsulfo))phenoxy]pentoxy)benzoate.

7. A dyeable linear polyester consisting essentially of the condensation product of (a) dimethyl terephthalate; (b) 1,4-cyclohexanedimethanol; and, based upon the total amount of said dimethyl terephthalate, (c) from about 0.1 to about 3.5 mole percent of a compound of the formula:

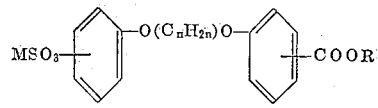

wherein M is an alkali metal having an atomic number of from 3 to 19, n is an integer of from 2 to 8, and R is methyl.

8. A dyeable linear polyester consisting essentially of the condensation product of (a) dimethyl terephthalate; (b) 1,4-cyclohexanedimethanol; and based upon the total amount of said dimethyl terephthalate, (c) from about 0.15 to about 2.5 mole percent of methyl 4-(5-[4-((sodiumsulfo))phenoxy]pentoxy)benzoate.

9. A dyeable linear polyester consisting of (a) a mixture of dicarboxylic acid compounds consisting of from about 90 to about 99.9 mole percent of dimethyl terephthalate and from about 0.1 to about 10 mole percent of dimethyl isophthalate; (b) ethylene glycol; and, based upon the total amount of said mixture of dicarboxylic acid compounds, (c) from about 0.15 to about 2.5 mole percent of methyl 3 - (2 - [4-((sodiumsulfo))phenoxy]ethoxy)benzoate.

10. A dyeable linear polyester consisting of (a) a mixture of dicarboxylic acid compounds consisting of from about 90 to about 99.9 mole percent of dimethyl terephthalate and from about 0.1 to about 10 mole percent of dimethyl isophthalate; (b) ethylene glycol; and, based upon the total amount of said mixture of dicarboxylic acid compounds, (c) from about 0.15 to about 2.5 mole percent of methyl 4-(5-[4-((lithiumsulfo))phenoxy]-pentoxy)benzoate.

11. A dyeable linear polyester consisting of (a) a mixture of dicarboxylic acid compounds consisting of from about 90 to about 99.9 mole percent of dimethyl terephthalate and from about 0.1 to about 10 mole percent of dimethyl 2-(potassiumsulfo)fluorene-9,9-dipropionate; (b) ethylene glycol; and, based upon the total amount of said mixture of dicarboxylic acid compounds, (c) from about 0.15 to about 2.5 mole percent of methyl 4-(5-[4-((lithiumsulfo))phenoxy]pentoxy)benzoate.

12. A dyeable linear polyester consisting of (a) a mixture of dicarboxylic acid compounds consisting of from about 90 to about 99.9 mole percent of dimethyl terephthalate and from about 0.1 to about 10 mole percent of dimethyl sebacate; (b) ethylene glycol; and, based upon the total amount of said mixture of dicarboxylic acid compounds, (c) from about 0.15 to about 2.5 mole percent of methyl 3-(2-[4-((sodiumsulfo))phenoxy]ethoxy)benzoate.

13. A dyeable linear polyester consisting essentially of (a) a mixture of dicarboxylic acid compounds consisting of from about 90 to about 99.9 mole percent of dimethyl terephthalate and from about 0.1 to about 10 mole percent of dimethyl 5-(2-[4-((sodiumsulfo))phenoxy]ethoxy)isophthalate; (b) ethylene glycol; and based upon the total amount of said mixture of dicarboxylic acid compounds, (c) from about 0.15 to about 2.5 mole percent of methyl 2-(2-[4-((potassiumsulfo))phenoxy]ethoxy)benzoate.

14. A heat-stretched, dyeable textile article composed of a dyeable linear polyester consisting essentially of the condensation product of (a) a dicarboxylic acid compound selected from the group consisting of the monocyclic aromatic dicarboxylic acids and the dialkyl esters thereof; (b) an aliphatic glycol containing from 2 to 10 carbon atoms; and, based upon the total amount of said dicarboxylic acid compound, (c) from about 0.1 to about 3.5 mole percent of a compound of the formula:

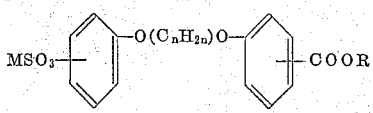

wherein M is an alkali metal, n is an interger of from 1 to 12, and R is selected from the group consisting of hydrogen and alkyl.

15. A heat-stretched, dyeable textile article composed of a dyeable linear polyester consisting essentially of the condensation product of (a) dimethyl terephthalate; (b) a compound of the formula:

$$HO(CH_2)_mOH$$

wherein m is an integer of from 2 to 10; and, based upon the total amount of said dimethyl terephthalate, (c) from about 0.1 to about 3.5 mole percent of a compound of the formula:

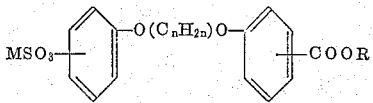

wherein M is an alkali metal having an atomic number of from 3 to 19, n is an integer of from 2 to 8, and R is methyl.

16. A heat-stretched, dyeable textile article composed of a dyeable linear polyester consisting essentially of the condensation product of (a) dimethyl terephthalate; (b) ethylene glycol; and, based upon the total amount of said dimethyl terephthalate, (c) from about 0.1 to about 3.5 mole percent of a compound of the formula:

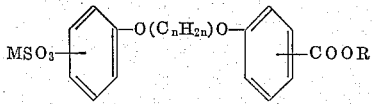

wherein M is an alkali metal having an atomic number of from 3 to 19, n is an integer of from 2 to 8, and R is methyl.

17. A heat-stretched, dyeable textile article composed of a dyeable linear polyester consisting essentially of the condensation product of (a) dimethyl terephthalate; (b) ethylene glycol; and, based upon the total amount of said dimethyl terephthalate, (c) from about 0.15 to about 2.5 mole percent of methyl 3-(2-[4-((sodiumsulfo))phenoxy]ethoxy)benzoate.

18. A heat-stretched, dyeable textile article composed of a dyeable linear polyester consisting essentially of the condensation product of (a) dimethyl terephthalate; (b) 1,4-cyclohexane-dimethanol; and, based upon the total amount of said dimethyl terephthalate, (c) from about 0.1 to about 3.5 mole percent of a compound of the formula:

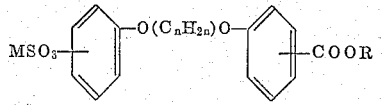

wherein M is an alkali metal having an atomic number of from 3 to 19, n is an integer of from 2 to 8, and R is methyl.

19. A heat-stretched, dyeable textile article composed of a dyeable linear polyester consisting essentially of the condensation product of (a) dimethyl terephthalate; (b) 1,4-cyclohexanedimethanol; and, based upon the total amount of said dimethyl terephthalate, (c) from about 0.15 to about 2.5 mole percent of methyl 4-(5-[4-((sodiumsulfo))phenoxy]pentoxy)benzoate.

References Cited in the file of this patent

UNITED STATES PATENTS

| | | |
|---|---|---|
| 2,901,466 | Kibler et al. | Aug. 25, 1959 |
| 2,970,165 | Michel et al. | Jan. 31, 1961 |
| 3,018,272 | Griffing et al. | Jan. 23, 1962 |

FOREIGN PATENTS

| | | |
|---|---|---|
| 549,179 | Belgium | Oct. 15, 1956 |